United States Patent [19]

Tanaka

[11] Patent Number: 4,593,731
[45] Date of Patent: Jun. 10, 1986

[54] DRIVING MEANS FOR ROTATING SPINDLES FOR USE IN A WOOD WORKING ROUTER OR THE LIKE

[75] Inventor: Takeshi Tanaka, Shizuoka, Japan

[73] Assignee: Shinko Machinery Works, Inc., Shizuoka, Japan

[21] Appl. No.: 641,024

[22] Filed: Aug. 15, 1984

[30] Foreign Application Priority Data

Sep. 28, 1983 [JP] Japan .................................. 58-181487

[51] Int. Cl.⁴ ............................ B27F 5/02; B27C 9/04
[52] U.S. Cl. ................................ 144/1 A; 144/145 A; 409/217; 29/40; 29/568
[58] Field of Search ........................... 29/39, 40, 568; 144/1 A, 145; 409/217; 408/35; 474/58

[56] References Cited

U.S. PATENT DOCUMENTS

| | | | |
|---|---|---|---|
| 504,289 | 8/1893 | Vanderbeek et al. | 144/1 A |
| 2,743,746 | 5/1956 | Davidson et al. | 144/1 A |
| 3,089,356 | 5/1963 | Westra | 474/58 |
| 3,292,235 | 12/1966 | Riedel | 29/568 |
| 3,760,472 | 9/1973 | Kielma et al. | 29/40 |
| 4,313,478 | 2/1982 | Suzuki | 144/1 A |

*Primary Examiner*—Donald R. Schran
*Attorney, Agent, or Firm*—Holman & Stern

[57] ABSTRACT

A device for rotating spindles in a wood working router includes a turret head rotatably mounted on a column extending from a machine face having radially orientated spindle heads and rotatable spindles, cutting tools respectively mounted on the working end of each of the spindles, a turret head positioning device for moving a selected one of the cutting tools to a processing position, an electric motor mounted within the column and having a drive pulley to rotate the spindles and a transmission having a drive belt driven by the motor engageable and disengageable with the spindle in the processing position to rotate the spindle and thereby the cutting tool to perform a cutting operation on a workpiece.

10 Claims, 7 Drawing Figures

DRIVING MEANS FOR ROTATING SPINDLES FOR USE IN A WOOD WORKING ROUTER OR THE LIKE

BACKGROUND OF THE INVENTION

1. Field of the Invention

The present invention relates to a device for rotating spindles for use in a wood working machine and more particularly, to a means for rotating tools for use in a NC (Numerical Control) router which works on woods, plastic, stones and the like.

2. Description of the Prior Art

A cutting tool for use in a working machine of this kind needs to be rotated up to about 30,000 revolutions per minute and also, a wide range of rotational speed, i.e., 2,000 to 25,000 rpm, is practically necessary. For this purpose, a high-frequency motor or the like is exclusively employed as a means for rotating the cutting tool, which controls the rotational speed by changing the frequency. However, such high-frequency motor requires ancillary devices such as a frequency changer, a field control transformer and the like, thereby increasing the cost thereof.

Multi-shaft heads (turret heads and parallel heads) have recently been developed for the NC router as disclosed in U.S. Pat. No. 4,313,478 to Y. Suzuki from the standpoint of productivity and operating efficiency. In this case, however, a corresponding number of high-frequency motors is required in association with each tool. Thus, a high-grade router may not be provided at low cost.

BRIEF SUMMARY OF THE INVENTION

It is the primary object of the present invention to provide a means for rotating a selected one of a plurality of spindle heads by means of an electric motor.

It is another object of the present invention to provide a compact-size driving means including a transmission means which may be engaged and disengaged corresponding to a spindle head in a desired processing position.

It is a further object of the present invention to provide a high-grade router at low cost by reducing the cost of a driving means.

The invention will now be described in detail with reference to the accompanying drawings wherein:

DETAILED DESCRIPTION

Figure 1:
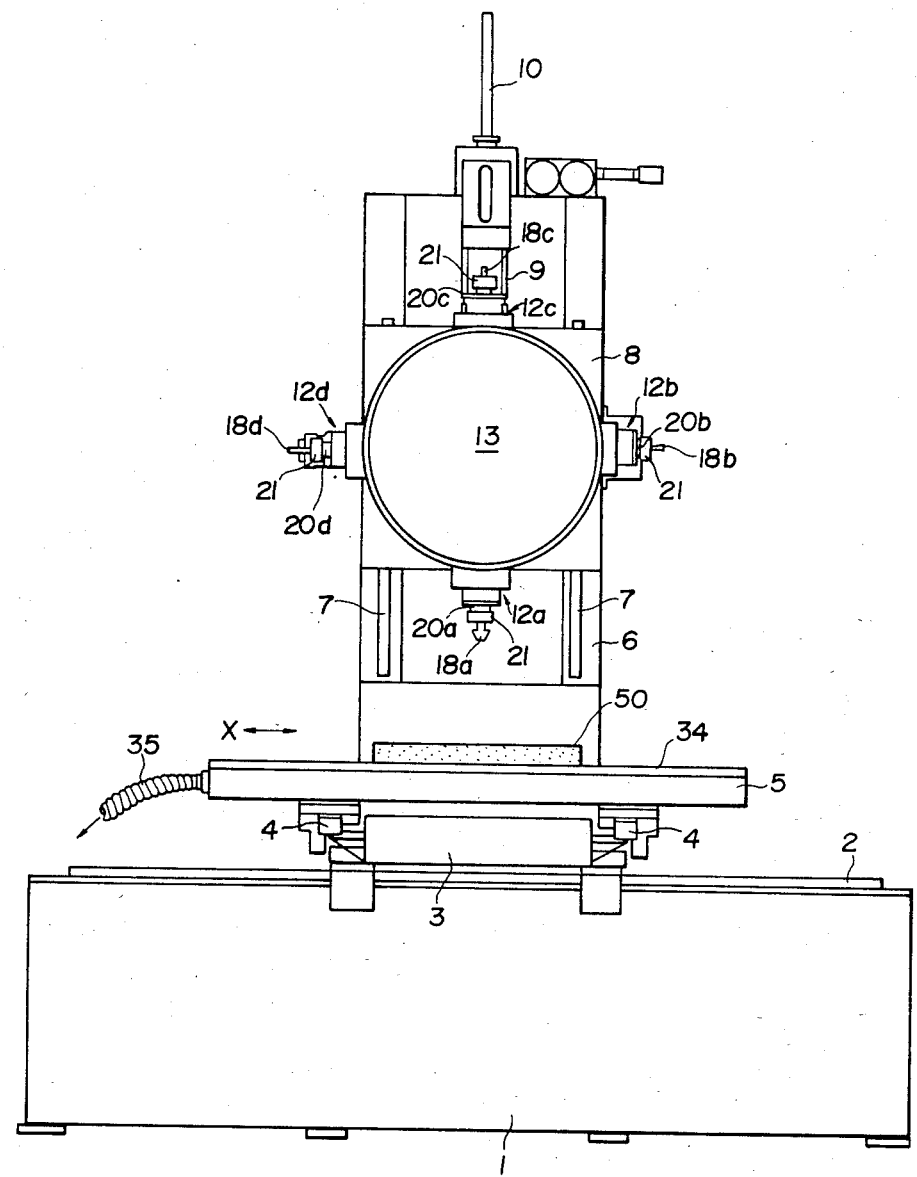
FIG. 1 is a front elevational view of a NC router to which a means for rotating tools according to the present invention is applied.
Figure 2:
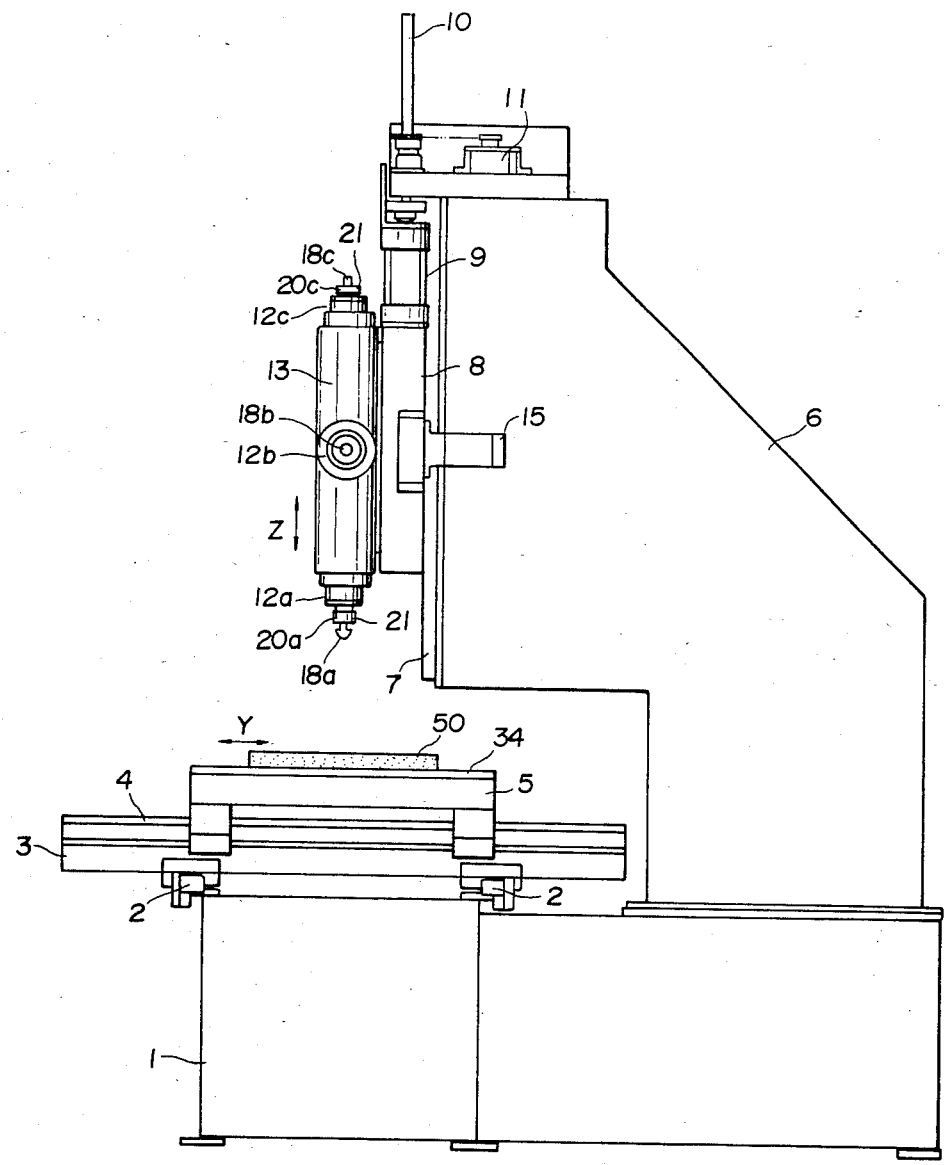
FIG. 2 is a right side elevational view of FIG. 1.

In FIGS. 1 and 2, horizontally extending guide rails 2 are provided on a machine base 1 in a NC (Numerical Control) router. A first moving base 3 is slidably engaged with said guide rails 2 and is free to move in the direction of X (shown in FIG. 1) along the rails. The movement of the first moving base 3 in the direction of X (shown in FIG. 1) is regulated by a servo motor in association with a feed screw (not shown) provided in the guide rails 2. Further, provided on the upper surface of the first moving base 3 are guide rails 4 which respectively extend horizontally in a direction perpendicular to the guide rails 2. A second moving base 5 is slidably engaged with said guide rails 4 and is free to move in the direction of Y (shown in FIG. 2) along rails 4. The movement of the second moving base 5 in the direction of Y (shown in FIG. 2) is regulated by a servo motor (not shown) in association with a feed screw in the same manner as previously described with the first moving base 5. Also, provided on the upper surface of the second base 5 is a suction table 34 for the purpose of fixing a workpiece 50 thereto. This suction table 34 is formed on its upper surface with a number of suction holes and is connected to a vacuum means (not shown) through a pipe 35.

Reference numeral 6 is a column disposed at the rear side of the machine base 1, said column 6 being provided with vertically extending guide rails 7 along the front side thereof. A base 8 is engaged with these guide rails 7 and is free to move vertically along rails 7. The movement of the base 8 in the direction of Z (shown in FIG. 2) is regulated by a servo motor 11 and a feed screw 10 via a rapid working air cylinder 9. In the embodiment as illustrated, four spindle heads 12a-12d are radially provided in a turret head 13 and this turret head 13 is rotatably supported on the front side of the base 8. Further, provided at the outer periphery of a boss portion 33 on the turret head 13 is a gear 14. This gear 14 is in meshing engagement with a pinion 16 whereby the turret head 13 is rotated by means of a motor 15.

The turret head 13 is rotated 90° upon each rotation by means of a control signal provided based on a program memorized in a numerical control unit thereby to select which one of the spindle heads to use. When a selected one of the spindle heads 12a-12d is placed in a predetermined processing position, a projecting member 19 provided at the end of a piston rod is brought into engagement with a receiving aperture 49 formed at the turret head side by stopping the motor 15 and in turn, actuating a positioning air cylinder 17. In this manner, the movement of the selected spindle head is locked and is, then, prepared for the cutting process.

Reference character LS1 is a limit switch adapted to detect the condition upon which rotation of the turret head 13 is prevented as the projecting member 19 is in a locked position. On the other hand, reference character LS2 is a limit switch adapted to detect the condition upon which the turret head 13 is allowed to be rotated as the projecting member 19 is in an unlocked position. Further, there is provided in the turret head 13 a means for detecting which one of the spindle heads 12a-12d is placed in a predetermined processing position. This detecting means comprises limit switches LSa-LSd provided at the inside of the boss portion 33 in the turret head 13 corresponding respectively to the spindle 12a-12d and a dock 36 provided at the column 6 corresponding to these limit switches LSa-LSd. It will be noted that the limit switch LSa corresponding to the spindle head 12a is provided in the vicinity of the turret head 13, although it may not be seen in FIGS. 3 and 4.

It will also be noted that the processing position of each of the spindle heads 12a-12d indicates when the respective spindle is positioned downwards vertically and the associated cutting tool is thus positioned toward the suction table 34.

Spindles 20a-20d are rotatably supported respectively on the spindle heads 12a-12d via a bearing, one end portion of each of which extends outwardly from the turret head 13 and has a collet chuck 21 at its front end. Respectively mounted on the collet chucks 21 are cutting tools 18a-18d. The other end of each of the spindles 20a-20d extends within the turret head 13 and is provided with a passive pulley 22. It will be noted that when the turret head 13 is rotated, the passive pulleys 22 respectively take the same route since they are provided on the same circumference.

Figure 3:
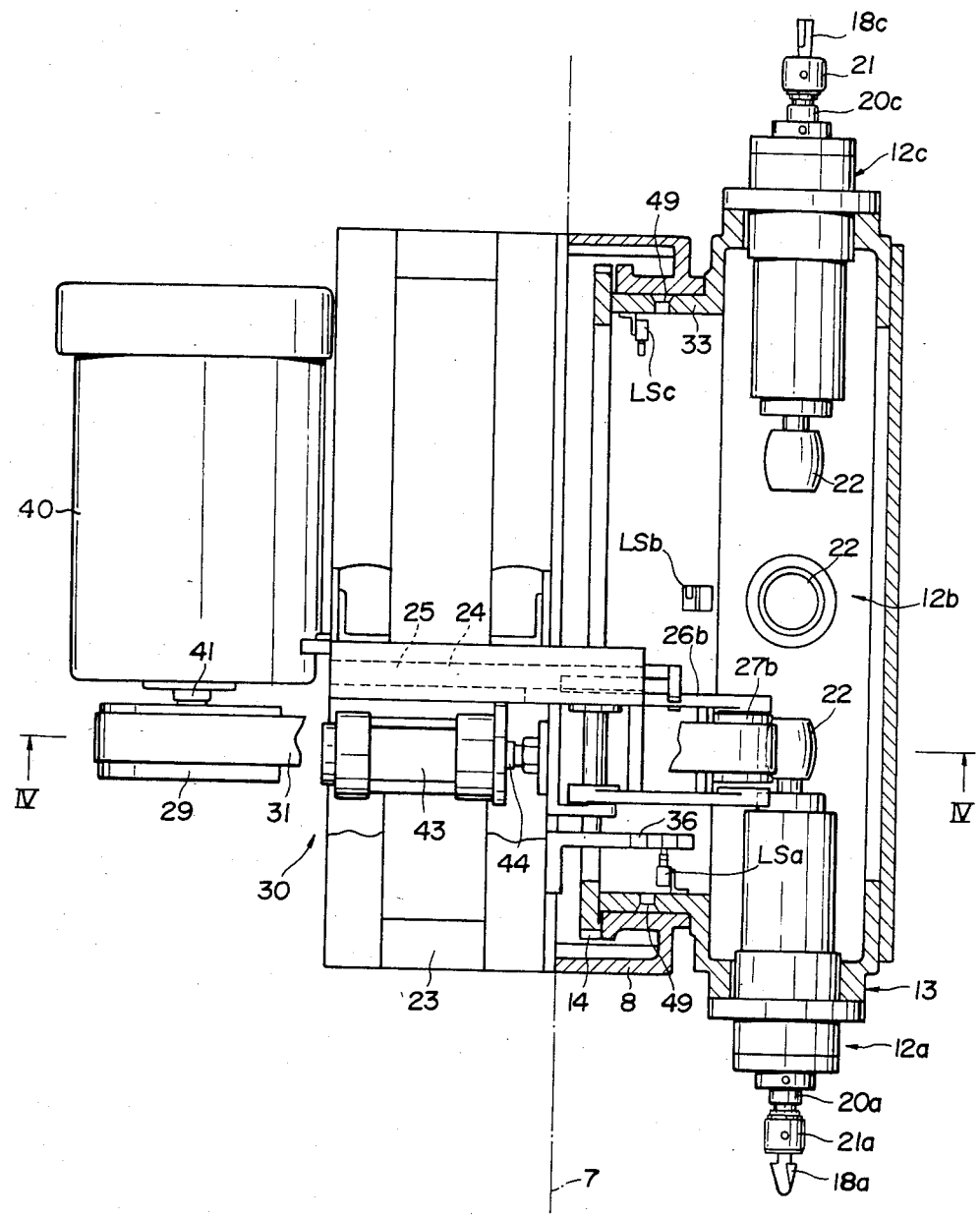
FIG. 3 is a vertical cross sectional view of an enlarged scale of a turret head in the NC router as shown in FIG. 1.
Figure 4:
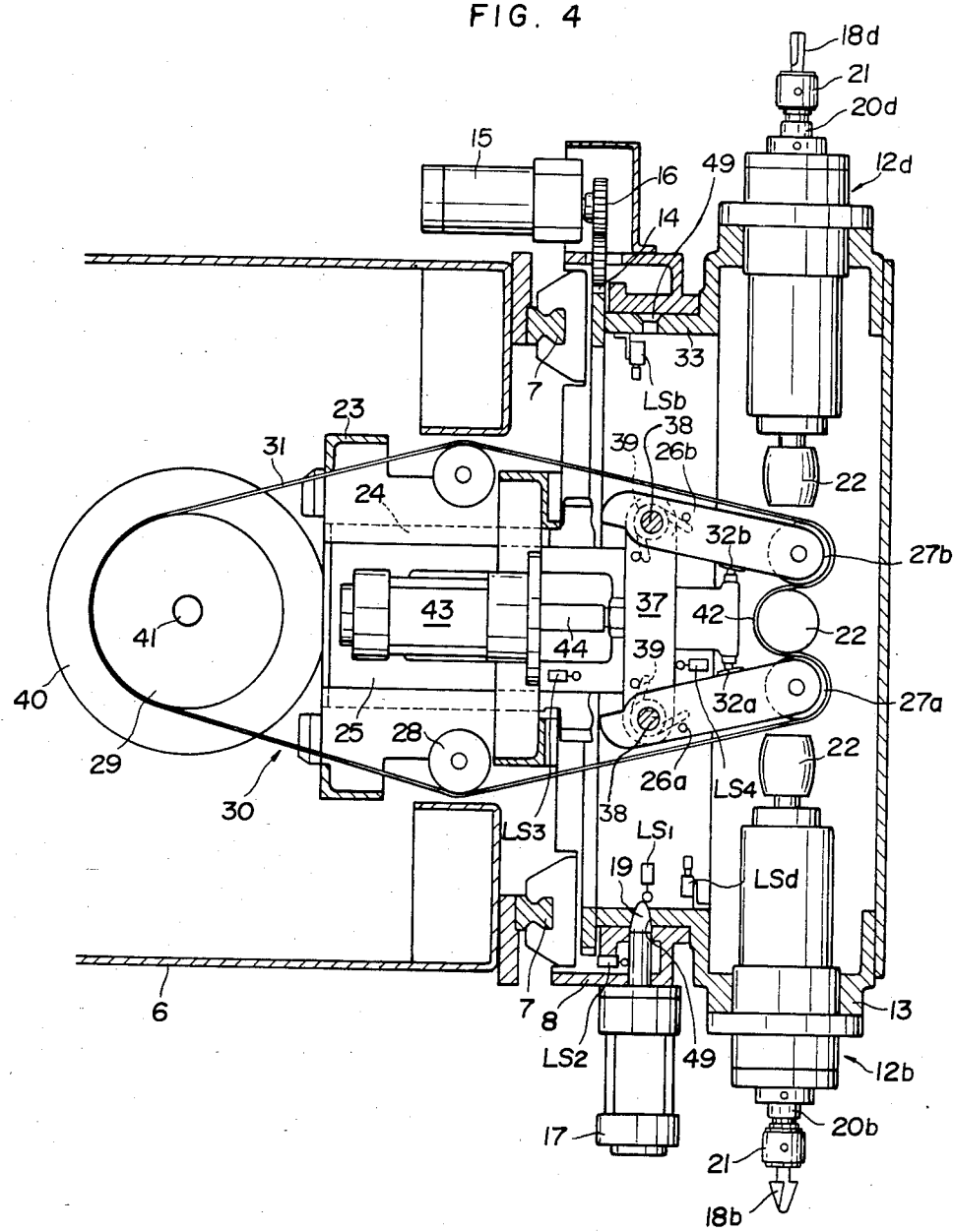
FIG. 4 is a cross sectional view taken along the line IV—IV of FIG. 3.

Reference is now made to a driving means for rotating the spindle heads 12a-12d via the passive pulleys 22 taken in connection with FIGS. 3 and 4. This driving means comprises a transmission means 30 which may be engaged and disengaged with a specific spindle in the processing position and an electric motor 40 associated with said spindle via this transmission means 30. Reference numeral 23 indicates a mounting frame positioned at the rear side of the turret head 13 and provided at the upper portion of the interior of the column 6.

Reference numeral 24 indicates a guide provided in the mounting frame 23. An actuating base 25 is slidably engaged with this guide 24 and is free to move along it. A pair of rotating arms 26a, 26b respectively project forward horizontally from both ends of a front end member 37 of the actuating base 25 to which each arm is pivotally attached via a pin 38. Idler pulleys 27a, 27b are rotatably mounted respectively to the free ends of the rotating arms 26a, 26b. Further, torsion springs 39 are respectively provided at portions where the rotating arms 26a, 26b are supported and are adapted to bias the rotating arms 26a, 26b in opposite rotational directions to urge pulleys 27a, 27b apart.

The electric motor 40 is fixedly mounted downward behind the mounting frame 23. A driving pulley 29 of an increased diameter is mounted to an output shaft 41 of the electric motor 40. A belt 31 of predetermined length runs over the driving pulley 29, a guide rollers 28 and said pair of idler pulleys 27a, 27b, thereby constructing the driving means 30. The belt 31 is tensioned as the idler pulleys 27a, 27b are opened. Under such conditions, as shown in FIG. 4, a belt running portion 42 which runs windingly over and between the idler pulleys 27a, 27b and the passive pulley 22 is positioned at the rear side of the passive pulley 22 when the passive pulley 22 is in the processing position as mentioned above, thereby facilitating the rotary movement of the passive pulley 22. It will be noted that dislocation of the belt 31 due to centrifugal force upon high-speed rotary movement may be prevented. Therefore, a flat belt may advantageously be employed and a V-belt may also be employed in lieu thereof. By the use of these belts, operation may quietly be carried out at high-speed rotary movement.

Reference numeral 43 is an actuating air cylinder for the transmission means 30, a piston rod 44 of which is associated with the actuating base 25. When the piston rod 44 is retracted, the transmission means 30 is held in a separated position so as to cease transmitting the rotary movement to the passive pulley 22, i.e., the belt portion 42 is withdrawn out of contact with pulley 22. On the other hand, when the piston rod 44 is extended, the transmission means 30 is slidingly moved toward the passive pulley 22 via the actuating base 25. Then, the belt running portion 42 is biased against the passive pulley 22 and is brought into contact with the same while narrowing the distance between the idler pulleys 27a and 27b. Thereby, the rotary movement is transmitted to the passive pulley 22. Reference numerals 32a, 32b indicate stop members adapted to regulate inward movement of the rotating arms 26a, 26b. The distance between the idler pulleys 27a and 27b is established by means of these stop members 32a, 32b and the engaging amount of the belt 31 against the passive pulley 22 is then determined.

Reference numeral LS3 is a limit switch adapted to detect the condition in which the transmission means 30 is withdrawn out of engagement the passive pulley 22. Further, reference numeral LS4 is a limit switch adapted to detect the condition in which the transmission means 30 is in engagement with the passive pulley 22.

In this embodiment, a general-purpose induction motor is employed as the electric motor 40 and the rotary speed of this motor is regulated by means of a variable frequency inverter.

While the construction of the present invention has been described hereinabove, a cutting process by the use of a plurality of cutting tools 18a-18d will now be explained.

As is well known, all the necessary information concerning processing steps, the order of use and rotational number of the cutting tools in response to objects to be processed is entered in the numerical control unit. Thus, the cutting process is carried out according to its program.

Operation of the cutting tools will now be described in detail. Namely, when processing work by a certain cutting tool has been completed, the air cylinder 43 is first actuated and then, the transmission means 30 is withdrawn from engagement with the passive pulley 22 thereby to cease transmitting the rotary movement thereto. When this separation of the transmission means 30 from the passive pulley 22 is detected by the limit switch LS3, the air cylinder 17 is actuated so as to disengage the projecting member 19 with the receiving or indexing aperture 49 in the turret head 13, thereby allowing the turret head 13 to rotate. When this state is detected by the limit switch LS2, the motor 15 is driven and the next spindle head to be selected based upon the program is placed in the processing position. Then, the projecting member 19 is brought into engagement with the respective receiving or indexing aperture 49 thereby to lock the turret head 13. It will be noted that the limit switch LS1 is adapted to confirm this locking of the turret head 13.

When the placement of the next cutting tool is thus completed, the piston rod 44 of the air cylinder 43 is extended so as to bias the transmission means 30 via the actuating base 25, thereby shifting the transmission means 30 toward the passive pulley 22. In this manner, the rotating arms 26a, 26b provided at the front end of the transmission means 30 are rotated inwardly against the action of the torsion springs 39 thereby to bias the belt running portion 42 against the passive pulley 22 while narrowing the distance between the idler pulleys 27a, 27b. The belt 31 is thus engaged with the passive pulley and idler pulleys 22 in the form of a W as shown in FIG. 4 whereby the rotary movement of the electric motor 40 is securely transmitted to the passive pulley 22 via the belt 31. Accordingly, the cutting tool in the spindle may smoothly be rotated at high speed. Thereafter, while the moving base 3, moving base 5 or base 8 is moved in the direction of X, Y and Z, a predetermined carving or other processing work may be performed.

In the above-mentioned embodiment, the transmission means 30 is regulated by the air cylinder 43 so that operation may rapidly be carried out and tension of the belt 31 may constantly be adjusted by air pressure.

Modified forms of the transmission means will now be described with reference to FIGS. 5 through 7, wherein like reference numerals designate like or corresponding parts as shown in FIGS. 1 through 4.

Figure 5:
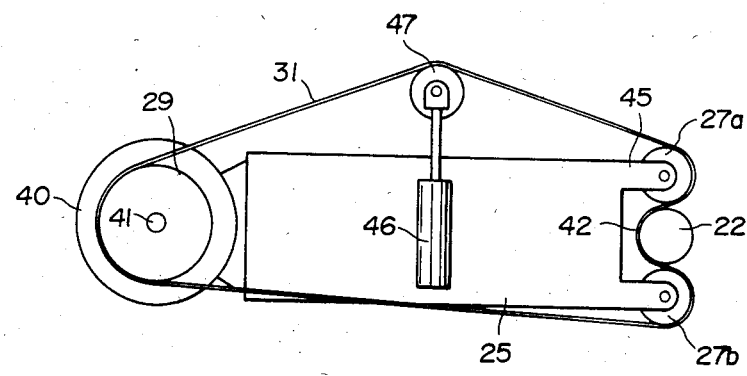
FIG. 5 is a schematic plan view of a modified form of the driving means shown in FIG. 4.

In one modified form of the transmission means as shown in FIG. 5, the electric motor 40 is not mounted to the mounting frame 23, but is fixedly mounted to the rear end of the actuating base 25 and the driving pulley 29 is provided on the output shaft 41 of the electric motor 40. Further, brackets 45 are respectively provided at the front end of the actuating base 25 and a pair of idler pulleys 27a, 27b are supported thereby. The belt 31 is engaged with these pulleys 27a, 27b and is also engaged at a suitable position with a take-up pulley 47 associated with the air cylinder 46. Here, the belt running portion 42 is engaged or disengaged with the passive pulley 22 by forward or backward movement of the actuating base 25. In this example, the tension of belt 31 may be controlled by means of the take-up pulley 47.

Figure 6:
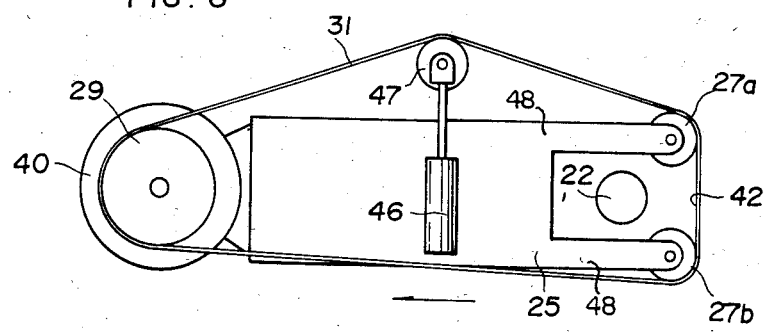
FIG. 6 is a schematic plan view of another modified form of the driving means.
Figure 7:
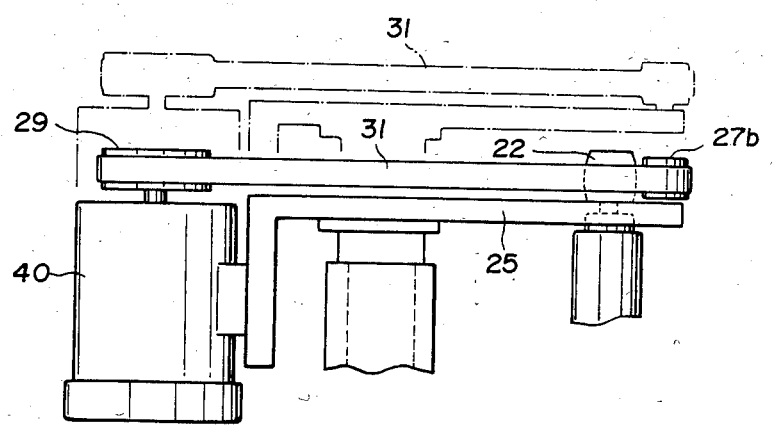
FIG. 7 is a bottom view of FIG. 6.

In FIGS. 6 and 7, there is shown another modified form of the transmission means. The electric motor 40 and idler rollers 27a, 27b are mounted to the actuating base 25 which is free to move side to side as with the previous modified form thereof. In this case, however, longer brackets 48 are provided and the passive pulley 22 on the spindle in the processing position is positioned at a space formed between these brackets 48. Further, the actuating base 25 is moved in the direction of the arrow shown in FIG. 6 whereby the belt 31 is disengaged with the idler rollers 27a, 27b and is, in turn, engaged with the passive pulley 22, thereby transmitting the rotary movement thereto. For rotation of the spindles 20a-20d in the turret head 13, the belt 31 and other members must be shifted from operational position as shown by the solid line in FIG. 7 to an extended non-operational position as shown by the imaginary line in FIG. 7, namely, in a direction perpendicular to the axis of rotation of the turret head so as not to interface with the rotation of the spindles 20a-20d.

As is clear from the foregoing description, according to the present invention, the transmission means is freely engaged and disengaged with the spindle in the processing position and the rotary movement of the electric motor is transmitted to the spindle. In this arrangement, as compared with a conventional manner in which an exclusive motor is required for each motor, the manufacturing cost may outstandingly be reduced and the objects of the invention are thus rationally achieved.

I claim:

1. A driving apparatus for rotating spindles in a wood working router machine comprising:
   a machine base;
   a support column extending from said base having a front side;
   a turret head movably mounted on the front side of said column;
   a plurality of spindle heads mounted in radial orientation on said turret head;
   a spindle having a working end rotatably mounted in each spindle head;
   cutting tools respectively mounted at said working end of each of said spindles;
   turret head positioning means for moving said turret head to position a selected one of the cutting tools into a processing position for performing a cutting operation;
   an electric motor mounted within said column; and
   transmission means for transmitting rotary movement of said electric motor to a spindle in the processing position, said transmission means comprising a driving pulley mounted on said electric motor to be driven thereby, at least one pair of spaced idler pulleys mounted on said column, a drive belt operatively engaging said driving and idler pulleys, a passive pulley mounted on each spindle within said turret head, and an actuating means movably mounted on said column for engaging and disengaging said drive belt with the passive pulley on the spindle in the processing position by moving said idler pulleys toward and retracting them from, respectively, the passive pulley in the processing position.

2. A driving apparatus as claimed in claim 1 wherein said turret head positioning means comprises:
   a boss portion on said turret head;
   a gear on said boss;
   a pinion gear mounted on said column operatively engaging said gear on said boss;
   an electric motor operatively engaging said pinion gear for driving said pinion gear;
   a plurality of indexing apertures in said boss;
   a fluid pressure operated piston and cylinder device mounted on said column;
   a projecting member connected to said piston and cylinder device for movement thereby into inserting engagement within said indexing apertures and retraction therefrom for retaining said turret head in a selected position; and
   a plurality of limit switches for detecting the processing position and the position of said projecting member.

3. A driving apparatus as claimed in claim 1 wherein:
   said actuating means retracts said idler pulleys to disengage said drive belt from said passive pulley in the processing position to allow moving said turret between selected positions.

4. A driving apparatus as claimed in claim 1 wherein:
   said idler pulleys are disposed on substantially opposite sides of said passive pulley when in the processing position; and
   said actuating means further comprises means for biasing said drive belt into engagement with said passive pulley in the processing position.

5. A driving apparatus as claimed in claim 4 wherein:
   said actuating means comprises a guide frame mounted within said column, an actuator base movably mounted in said guide frame for guided movement in a direction relative to said turret head, a piston-cylinder device mounted on said column with the piston operatively connected to said actuator base; and
   said transmission means further comprises a cross-bar mounted on said actuator base, idler pulley arms pivotally mounted at one end on said cross-bar adjacent the ends thereof, said idler pulleys being rotatably mounted on the other ends of said idler pulley arms, and torsion springs operatively mounted between said cross-bar and said idler pulley arms to bias said arms in a direction to urge said idler pulleys away from each other.

6. A driving apparatus as claimed in claim 1 wherein:
said actuating means comprises a guide frame mounted within said column, an actuator base movably mounted in said guide frame for guided movement relative to said turret head and having oppositely disposed ends, said electric motor being mounted on one end of said actuator base; and
said transmission means further comprises a pair of spaced arms projecting from the other end of said actuator base, said idler pulleys being rotatably mounted respectively on said projecting arms, and a drive-belt tensioning pulley mounted on said actuator base between the ends thereof operatively engaging said drive belt.

7. A driving apparatus as claimed in claim 6 and further comprising:
means for rotatably mounting said turret head on said column; and
means for moving said actuating means in a direction perpendicular to the axis of rotation of said turret head.

8. A wood working router comprising:
a machine base;
a first table movably mounted on said machine base for movement in a first direction relative to the machine base;
a second table movably mounted on said first table for movement in a second direction perpendicular to said first direction;
a support column extending upwardly from said base having a front side;
a turret head rotatably mounted on the front side of said column for vertical and rotational movement relative to said column;
a plurality of angularly spaced rotatable cutting tools respectively mounted on said turret head extending radially outwardly thereof;
turret head positioning means for moving said turret head to position a selected one of the cutting tools into a processing position for performing a cutting operation;
an electric motor mounted within said column; and
transmission means for transmitting rotary movement of said electric motor to a cutting tool in the processing position, said transmission means comprising a driving pulley mounted on said electric motor to be driven thereby, at least one pair of spaced idler pulleys mounted on said column, a drive belt operatively engaging said driving and idler pulleys, a passive pulley operatively engaging each cutting tool within said turret head, and an actuating means movably mounted on said column for engaging and disengaging said drive belt with the passive pulley on the cutting tool in the processing position by moving said idler pulleys toward and retracting them from, respectively, the passive pulley in the processing position.

9. A wood working router as claimed in claim 8 wherein said turret head positioning means comprises:
a boss portion on said turret head;
a gear on said boss;
a pinion gear mounted on said column operatively engaging said gear on said boss;
an electric motor operatively engaging said pinion gear for driving said pinion gear;
a plurality of indexing apertures in said boss;
a fluid pressure operated piston and cylinder device mounted on said column;
a projecting member connected to said piston and cylinder devide for movement thereby into inserting engagement within said indexing apertures and retraction therefrom for retaining said turret head in a selected position; and
a plurality of limit switches operatively mounted on said router and adapted for detecting the processing position and the position of said projecting member.

10. A wood working router as claimed in claim 8 wherein:
said actuating means comprises a guide frame mounted within a said column, an actuator base movably mounted in said guide frame for guided movement in a direction relative to said turret head, a piston-cylinder device mounted on said column with the piston operatively connected to said actuator base; and
said transmission means further comprises a cross-bar mounted on said actuator base, idler pulley arms pivotally mounted at one end on said cross-bar adjacent the ends thereof, said idler pulleys being rotatably mounted on the other ends of said idler pulley arms, and torsion springs operatively mounted between said cross-bar and said idler pulley arms to bias said arms in a direction to urge said idler pulleys away from each other.

* * * * *